(12) United States Patent
Dutt et al.

(10) Patent No.: US 10,554,676 B2
(45) Date of Patent: Feb. 4, 2020

(54) SYSTEM AND METHOD FOR BEHAVIOURAL BIOMETRIC AUTHENTICATION USING PROGRAM MODELLING

(71) Applicant: Zighra Inc., Ottawa (CA)

(72) Inventors: Deepak Chandra Dutt, Ottawa (CA); Anil Buntwal Somayaji, Ottawa (CA); Michael John Kendal Bingham, Ottawa (CA)

(73) Assignee: Zighra Inc., Ottawa (CA)

( * ) Notice: Subject to any disclaimer, the term of this patent is extended or adjusted under 35 U.S.C. 154(b) by 605 days.

(21) Appl. No.: 15/059,692

(22) Filed: Mar. 3, 2016

(65) Prior Publication Data

US 2016/0259924 A1 Sep. 8, 2016

Related U.S. Application Data

(60) Provisional application No. 62/127,468, filed on Mar. 3, 2015.

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC combination set(s) only.
See application file for complete search history.

(56) References Cited

U.S. PATENT DOCUMENTS

| 7,155,417 | B1 * | 12/2006 | Sagar | G06Q 20/16 705/68 |
| 7,162,741 | B2 * | 1/2007 | Eskin | H04L 63/1416 707/999.202 |
| 2003/0110393 | A1 * | 6/2003 | Brock | G06F 21/554 726/23 |
| 2013/0030875 | A1 * | 1/2013 | Lee | G06Q 10/06311 705/7.38 |
| 2013/0276118 | A1 * | 10/2013 | Kashyap | H04L 63/145 726/24 |

* cited by examiner

*Primary Examiner* — Khoi V Le
(74) *Attorney, Agent, or Firm* — MBM Intellectual Property Law LLP

(57) ABSTRACT

An authentication method for use in a device and comprises monitoring a program behavior stream comprising a plurality of program observables that comprises a program observable. The method records the program observable and matches the recorded first program observable to a program model selected from a plurality of program models stored within a program store. A user model is selected from a plurality of user models stored within a user store corresponding to the program model. A user behavior stream corresponding to the program observable is monitored and a user observable contained in the user behavior stream is recorded. The user observable is correlated to the user model and an authentication state associated with the device is determined based on the correlating.

13 Claims, 4 Drawing Sheets

SYSTEM AND METHOD FOR BEHAVIOURAL BIOMETRIC AUTHENTICATION USING PROGRAM MODELLING

CROSS-REFERENCE TO RELATED APPLICATIONS

This application claims priority to U.S. Provisional Application No. 62/127,468, filed Mar. 3, 2015, which is hereby incorporated by reference herein in its entirety

FIELD OF THE INVENTION

The present disclosure relates to biometric authentication systems for mobile devices.

BACKGROUND OF THE INVENTION

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

While the below description is written for mobile devices, it would be apparent to one having skill in the art that the embodiments described below could equally be applied to fixed or stationary devices and terminals with sensors as well.

Mobile devices such as smartphones, tablets and including wearable computing devices such as Google® Glass are vulnerable to being used by unauthorized individuals. Examples of unauthorized individuals include:
  a thief who steals a mobile device from a purse on a subway,
  a romantic partner checking text messages for signs of an affair,
  a person who obtains user credentials such as passwords or other explicit identifiers from other sources without consent, or
  a child looking to play games.

Mobile device users run serious risks when unauthorized users obtain access to such devices. These risks include fraud, theft, and release of private data. Therefore, there is a need for strong authentication for mobile devices.

Explicit and Implicit Authentication Schemes

Many users use explicit authentication schemes that are protected by a variety of mechanisms including personal identification numbers (PINs), passwords, gestures, and fingerprints, for primary authentication of mobile devices. As an example, similar to the use of lock screens in desktop-oriented operating systems, mobile devices such as smartphones all include, at the very least, a text-based lock screen authentication option.

Such explicit authentication schemes suffer from disadvantages when used as "stand-alone" primary authentication schemes.

For example, while lock screens can provide significant protections when properly used, they can also degrade the usability of a device for the following reasons. Firstly, several factors specific to mobile devices make text-based lock screen authentication less usable and secure than on desktop or notebook computers. For example, modern smartphones primarily employ touch-based on-screen keyboards that require switching between multiple screens in order to access infrequently used characters and use text prediction to improve typing accuracy. Good passwords, however, are long strings of characters that cannot be easily predicted and include multiple infrequently used characters. Secure passwords are thus hard to enter on smartphones.

PIN-based lock screens have advantages over text-based lock screens, as PINs are simpler to enter due to the larger, and fewer, buttons that are needed, and their shorter length. However, PINs are still not as easy to enter as on a physical keyboard. Furthermore, PINs are particularly easy for an attacker or impostor to observe, given their simplistic nature, by "shoulder surfing" or taking a video of a person typing in their PIN. Shoulder surfing is a significant problem as mobile devices such as smartphones are heavily used in public environments, places where an attacker/impostor can more easily observe PIN entry and steal a device.

The burden is so significant that many users forego the protection of lock screens. Even when users do use these explicit authentication schemes on a stand-alone basis, users may configure these schemes using weak credentials such as simple-to-enter passwords, or setting the device such that it locks itself infrequently.

A number of different approaches have been proposed to reduce the usability strain of text-based and PIN-based lock screen authentication mechanisms on mobile devices such as smartphones while maintaining high security. One popular alternative is a swipe pattern unlock screen, such as the standard Android pattern unlock interface. In the Android implementation, the password is an ordered series of connected points which the user connects by dragging their finger on the screen. While this is a usability improvement over text entry, the approach is still vulnerable to shoulder surfing by impostors, smudge attacks by impostors, as well as random guessing of common patterns.

Further, the protection provided is also incomplete, as some "unauthorized users" in fact, will know how to bypass the lock screen. For example, a user who obtains passwords or other explicit identifiers from other sources without consent may be able to bypass the lock screen.

Implicit authentication mechanisms provide a solution to overcome these problems when used as a primary authentication scheme. These mechanisms allow the device to identify the user without the user performing any explicit authentication actions. Some implicit authentication schemes for smartphones are based upon how users interact with a touchscreen. Implicit authentication schemes include how users hold the phone or may be based on a user's gait or movement.

To date, however, commercially available implicit authentication systems have offered only improved security guarantees, such as by ensuring the correct person is entering a PIN or password pattern, rather than the improved usability of a non-intrusive authentication system.

Biometric Approaches to Mobile Authentication: Static Biometrics

Biometrics have become an increasingly popular primary mobile authentication mechanism, especially in the past year with the introduction of fingerprint identification to Apple® iOS® Security and more recently Samsung smartphones.

Many primary authentication schemes use static biometrics, in that they are based upon one or more characteristics of the human body that remains stable over time. For example, fingerprint scanners, facial recognition systems, and eye scan-based authentication mechanisms are all commercially available for smartphones. Static biometrics generally have high true positive rates, that is, authorized users can easily unlock the device, and high true negative rates, that is, unauthorized users are rejected.

There are, however, limitations to using static biometrics as a primary mechanism. The first is that static biometric approaches require that the user take explicit action to authenticate themselves by exposing some part of their anatomy to a sensor. Such an explicit action is a distraction from the user's primary task, and as such frequent authentication checks will be unacceptable to most users. The second is that static biometrics can often be mimicked by impostors using relatively simple techniques known to those of skill in the art, for example, a picture of a person's face to fool a facial recognition sensor; or a latex finger to subvert a fingerprint scanner. This mimicry is fundamentally hard to stop because the primary sensor used is, essentially, a camera, and there are many ways of fooling cameras, and there are many ways of obtaining a copy of the original person's biometric data, for example, gathering fingerprints left elsewhere on a device.

Furthermore, some static biometrics may persist even when the user has either been killed or seriously injured by an impostor, such as, for example, retina scans and fingerprint authentication. Liveness detection, such as checking for blinking in an image while doing facial recognition, are, in practice, insignificant barriers to attackers because these sensors can also be defeated using means known to those of skill in the art.

While mimicry attacks against static biometrics is a concern, of greater concern are the extra steps required for authentication using static biometrics, similar to the problems posed by explicit authentication schemes. These authentication actions, no matter how simple, introduce friction that mobile device users will want to minimize, if not eliminate. A trade-off for lower security is often perceived as being worth the cost, at least until a device is compromised. This reduces the utility of static biometric approaches for primary authentication schemes.

Biometric Approaches to Mobile Authentication: Behavioral Biometrics

Biometrics in general distinguish users based upon invariants in "who they are." As previously discussed, static biometrics are based upon invariants in physical characteristics. Another possible biometric approach for primary authentication, is by using dynamic biometrics.

Dynamic biometrics or behavioral biometrics are based upon invariants in an individual's behavior. Generally, this behavior is consistent because of subconscious factors affecting how human bodies operate. While some schemes are based upon characteristics that are primarily involuntary, such as heartbeats, neural signals and other brain activity recorded in response to a specific visual or auditory stimulus most are based upon behavior that is under more conscious control.

Behavioral biometrics are, in general, more challenging to develop and deploy than static biometrics because human behavior is fundamentally variable. Despite this, the accuracy can be comparable to that of static biometrics-based systems because behavioral biometrics can take advantage of many more observations than static biometrics, and can do so in ways that require no additional work from the user. Behavioral biometrics have a long history, including, keyboard typing patterns, facial recognition, and handwriting recognition.

However, for primary authentication, there is a need to focus on behavioral biometrics that are easily observed during the course of normal mobile device usage, specifically behavioral biometrics that utilize mobile device sensors such as the camera, touchscreen, the accelerometer and the gyroscope. Furthermore, for primary authentication, these behavioral biometrics should be used within implicit authentication schemes, so as to be able to enjoy all the advantages of implicit authentication while avoiding the pitfalls of explicit authentication schemes.

Behavioral biometrics can be grouped into three categories: continuous, secondary and task-based. With a continuous behavioral biometric, the behavior of the user is continually observed and modeled, with the system detecting abnormal usage patterns associated with unauthorized use on an ongoing basis. With secondary biometrics, user behavior is monitored only while performing an explicit authentication task, such as a PIN entry. A task-based biometric is similar in spirit to a secondary biometric, except that any task can be observed and modeled, not just an explicit authentication task.

Each of these categories has strengths and weaknesses when employed on their own as a primary authentication mechanism. Since secondary biometrics are used together with explicit authentication tasks, these schemes may be intrusive for a user. This may impact usability as a primary authentication mechanism.

Continuous behavioral biometrics offer some advantages as a primary authentication mechanism. Since these biometrics can be integrated into an implicit authentication mechanism, they provide the most coverage with the least impact on regular user interactions. However, the prior art systems in continuous behavioral biometrics suffer from some issues. First, given the nature of continuous monitoring, such schemes must deal with a large, dynamic state space produced by the output of multiple sensors. This results in a highly complex, multi-modal data landscape that is very challenging to model as it changes with context. For example, if the user starts playing a game on their phone, then the data obtained may be very different from the case where the user is answering emails. Secondly, these schemes return high levels of false positive results when used for authentication, which means these schemes are not suitable for use in primary authentication. Finally, these schemes do not offer sufficient validation against adaptive attackers.

Task-based behavioral biometric primary authentication schemes also offer some advantages. Task-based biometrics leverage the muscle memory users build up doing a common task. The more habitual the activity, the more likely it will be to characterize normal behavior, and consequently, the easier it will be to detect anomalies. Also, it makes it harder to imitate thus making it more resistant to mimicry attacks.

However, these task-based behavioral schemes suffer from some limitations. Firstly, these schemes only model user behavior when doing specific tasks, which may make up only a small portion of overall device usage. Consequently, if an attacker can circumvent these actions they can perform their attack without being detected.

Furthermore, these tasks must be manually defined which makes them expensive to implement from a development perspective. This is because each task to be monitored has to be selected and explicitly defined. To further complicate the situation, the selected task may not be performed in all contexts and situations, which necessitates selection of different tasks for different contexts and situations.

Therefore, there is a need for an implicit primary authentication scheme which combines the advantages of task-based behavioral schemes and continuous behavioral biometric schemes but overcomes the disadvantages of both these schemes. That is, such a scheme should be difficult to circumvent, not require manual definition, have relatively low computational complexity, return sufficiently low levels of false positive results thus making the scheme suitable for use in authentication, and offer sufficient validation against adaptive attackers.

BRIEF SUMMARY

In one embodiment of the invention, an authentication method for use in a device and comprises monitoring a program behavior stream comprising a plurality of program observables that comprises a program observable. The method records the program observable and matches the recorded first program observable to a program model selected from a plurality of program models stored within a program store. A user model is selected from a plurality of user models stored within a user store corresponding to the program model. A user behavior stream corresponding to the program observable is monitored and a user observable contained in the user behavior stream is recorded. The user observable is correlated to the user model and an authentication state associated with the device is determined based on the correlating.

In other embodiments of the invention, a security event is raised when it is determined that the device is in an insecure state, based on the authentication state. If the number of security events exceeds a threshold it can be determined that an attack is occurring. If the device is determined to be in an insecure state, some embodiments of the invention communicate with a cloud server to restrict or deny access to the device.

In some embodiments of the invention the user behavior stream is a sequence of system calls.

In further embodiments of the invention the user observable comprises sensor data which may be raw information drawn from the set of sensor data or features extracted from raw information drawn from the set of sensor data.

The program store may comprise a cache that returns a cash hit of a cache miss depending on the matching of the recorded program observable to the program model. A cache hit rate can be calculated and an alternate program model can be selected from the plurality of program models when the cache hit rate drops below a threshold. Selecting the alternate program model can be based on a distance measure.

In some embodiments of the invention, the device is a mobile device.

The foregoing and additional aspects and embodiments of the present disclosure will be apparent to those of ordinary skill in the art in view of the detailed description of various embodiments and/or aspects, which is made with reference to the drawings, a brief description of which is provided next.

DETAILED DESCRIPTION

Program behavior modelling determines when a program is behaving "normally". Security researchers have noted that when device security has been compromised, systems running on a device begin to behave abnormally. By using a baseline reference of normal behavior, primary authentication schemes can raise an alert to a potential security compromise when one or more systems running on the device continually deviate from that baseline.

In one embodiment, program behavior modelling is combined with continuous behavioral biometrics to produce a comprehensive primary authentication scheme. Specifically, the user modelling of behavioral biometrics is combined with a mechanism for modelling program behavior.

The primary authentication scheme is amenable to implementation in a variety of ways. In one embodiment, this primary authentication scheme is run on the mobile device it is meant to protect. In another embodiment, the primary authentication scheme is implemented using a cloud-based implementation.

Figure 3A:
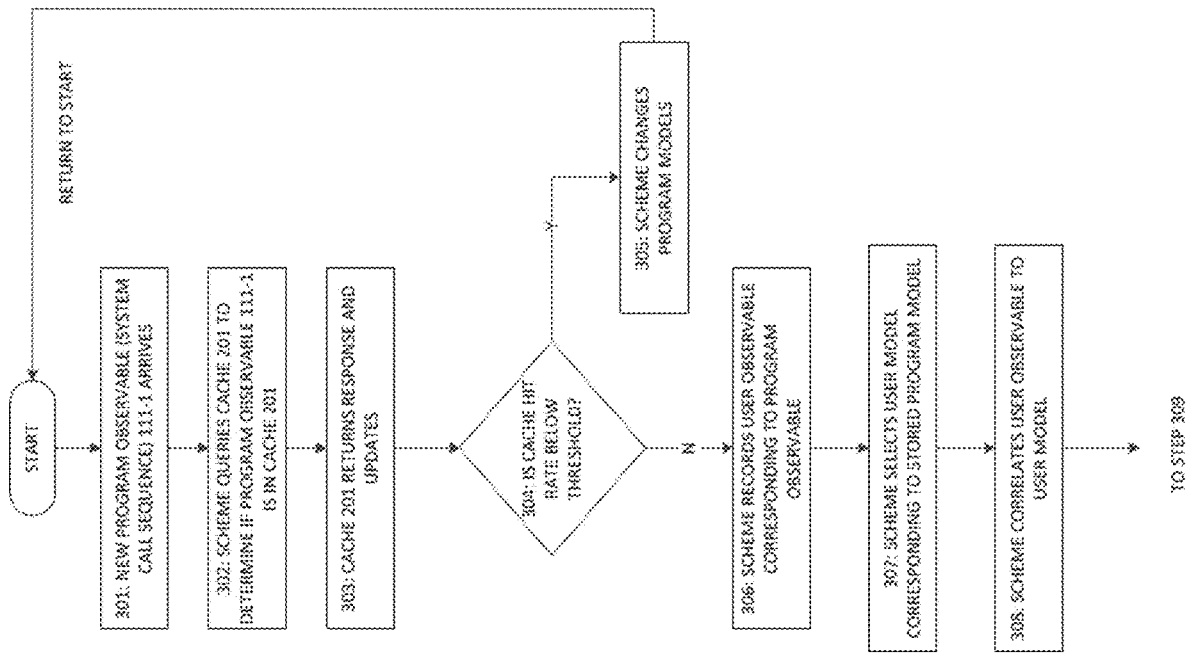
FIG. 3A is the first portion of flowchart of the operation of the authentication scheme when a new program observable arrives from a program behavior stream.
Figure 3B:
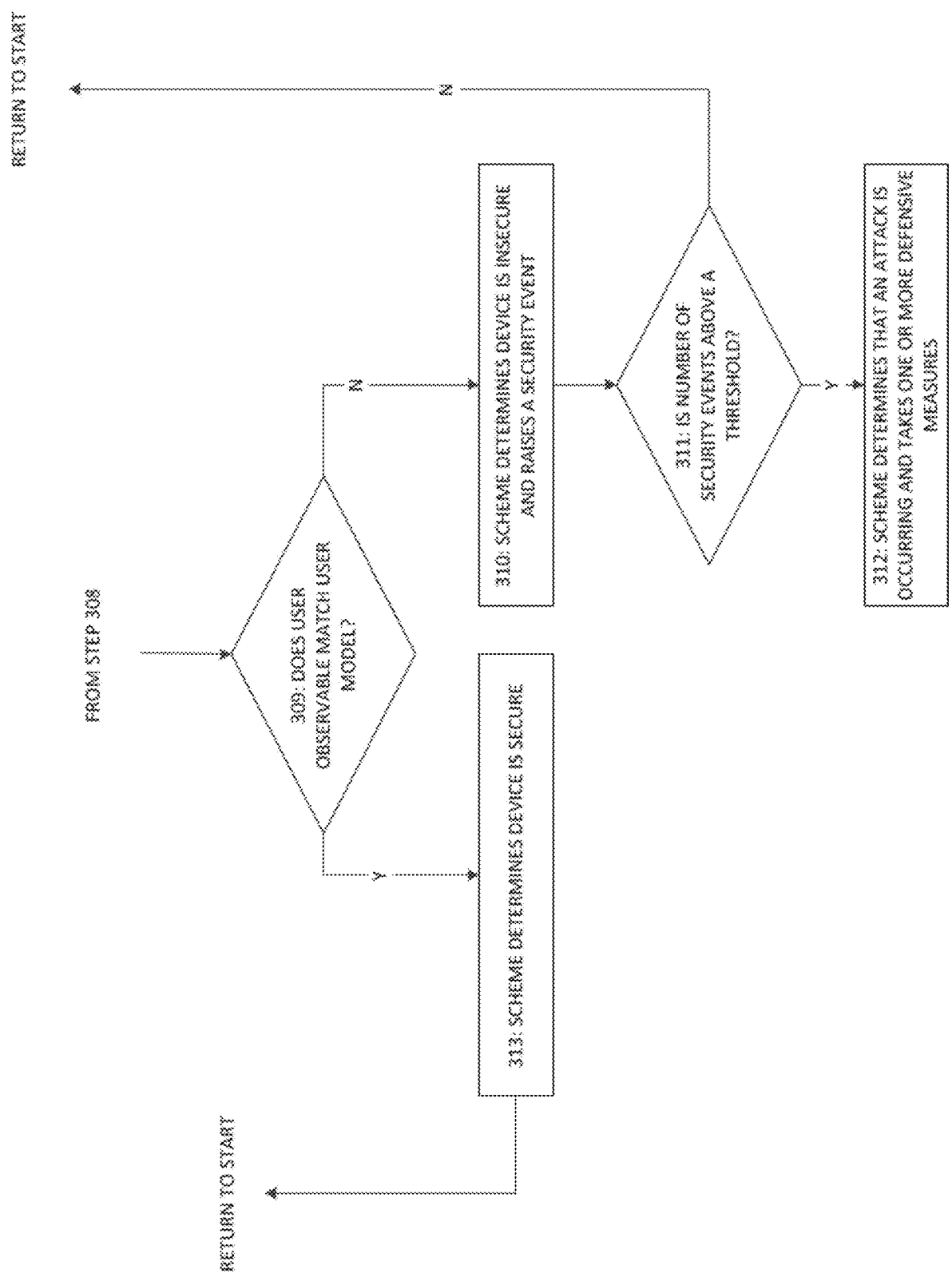
FIG. 3B is the second portion of a flowchart of the operation of the authentication scheme when a new program observable arrives from the program behavior stream.

Embodiments of the invention may be implemented using the transaction authentication information unit in a mobile device as described in FIG. 3B of U.S. patent application Ser. No. 14/337,939, hereby incorporated by reference in its entirety. Mobile devices can include cellular phones, laptop computuers, tablets, wearable computers, Internet of Things devices, and other computing devices as known in the art.

In one embodiment, the scheme uses a program model selected from a store of program models to see if there is a match to currently observed program behavior. If there is a match, then the scheme evaluates the user behavior corresponding to the selected program model. In one embodiment, this evaluation comprises selecting an appropriate model of expected user behavior. Then, the scheme correlates the user's currently observed behavior to the selected model of expected user behavior. If there is a match, the scheme determines that the device is in a secure state. If there is no match, then the scheme determines that the device is in an insecure state, and raises a security event.

Figure 1:
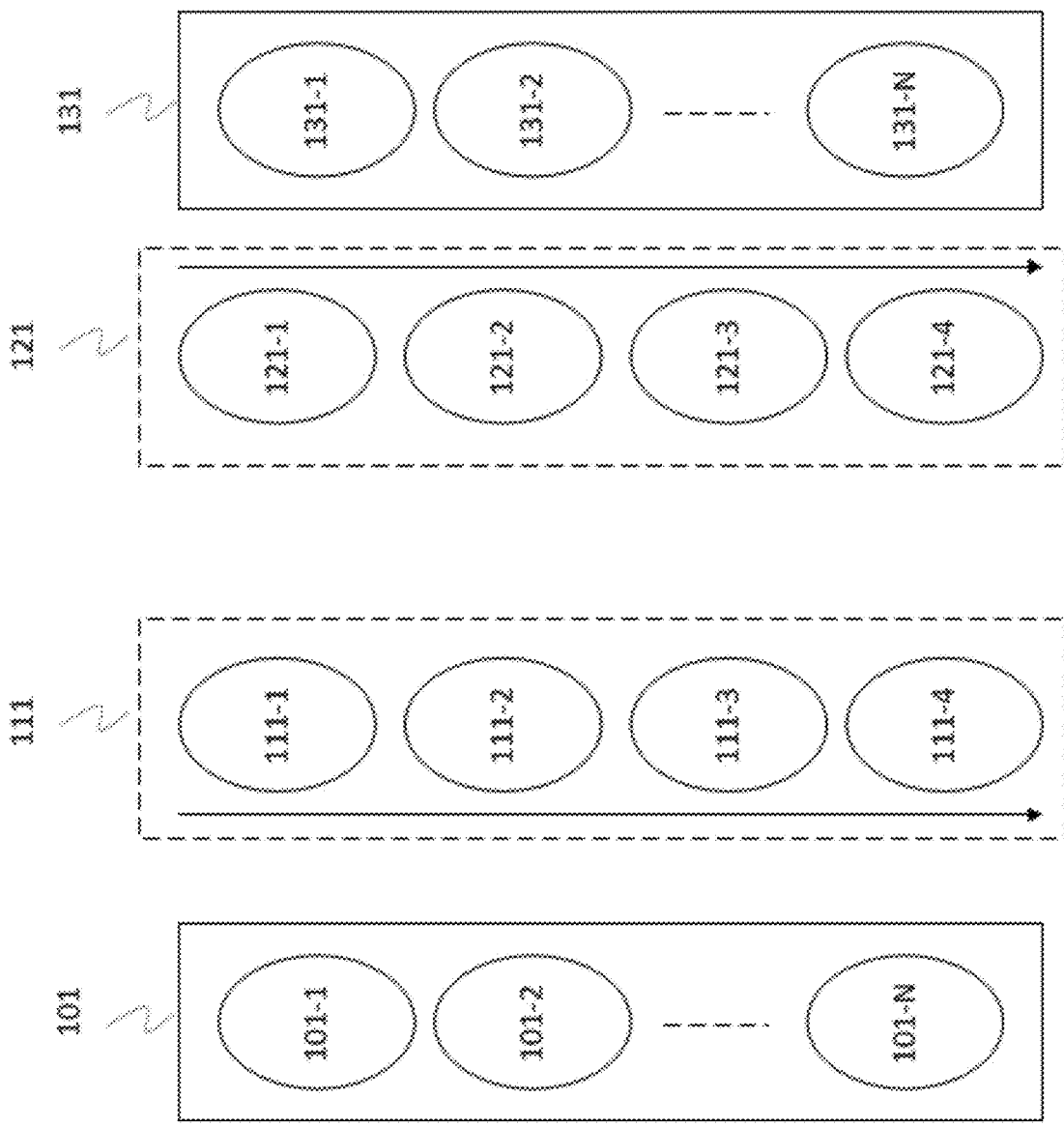
FIG. 1 illustrates a detailed embodiment of the operation of the authentication scheme to correlate the user's currently observed behavior to the selected model of expected user behavior.

FIG. 1 illustrates a detailed embodiment of the operation of the authentication scheme to correlate the user's currently observed behavior to the selected model of expected user behavior. In FIG. 1, in one embodiment, the scheme keeps a program store 101 of program models 101-1 to 101-N. Only certain program models are selected for the program store. The selection is made on the basis of quality. A program model is considered high quality if the model predicts program behavior with high accuracy. In one embodiment, each program model is a set of sequences of system calls. In a further embodiment, a sequence of system calls is represented as a tuple of system calls, for example (open, read, close). Then, a program model such as model 101-1 comprises of a set of these tuples. An example of a model is {(open, read, close), (read, close, write), (close, write, mmap)}. In other embodiments, sets of sequences of function calls, API calls, IPC calls, or any other sequence of program operations at a chosen level of abstraction are used in place of sets of sequences of system calls.

The scheme also keeps a user store 131 of user models 131-1 to 131-N. In one embodiment, the user model is a set of sensor data drawn from sensors on the mobile device such as the accelerometer, gyroscope, camera and touch screen. In a further embodiment, the sensor data is either (1) the sensor information itself, or
(2) some feature representation of the sensor information.

For example, the touch screen on a typical mobile device returns a series of touch events, typically coordinates with a timestamp. In case (1) the sensor data comprises this raw information. In case (2) the sensor data comprises features extracted from this raw information, such as the starting point of a movement or the length of a continuous movement.

Each of the program models corresponds to one of the user models. For example program model 101-1 corresponds to user model 131-1; program model 101-2 corresponds to user model 131-2 and so on.

When a user uses an application on the device, the scheme monitors two continuous streams of information:

the program behavior stream 111 comprising one or more program observables such as, for example, 111-1, 111-2, 111-3 and 111-4. Each program observable is a sequence of system calls; and the user behavior stream 121 comprising one or more user observables such as, for example, 121-1, 121-2, 121-3 and 121-4. Each user observable is a portion of the sensor data drawn from sensors such as the accelerometer, gyroscope, camera and touchscreen and corresponds to a program observable. For example user observable 121-1 corresponds to 111-1, 121-2 corresponds to 111-2 and so on.

Figure 2:
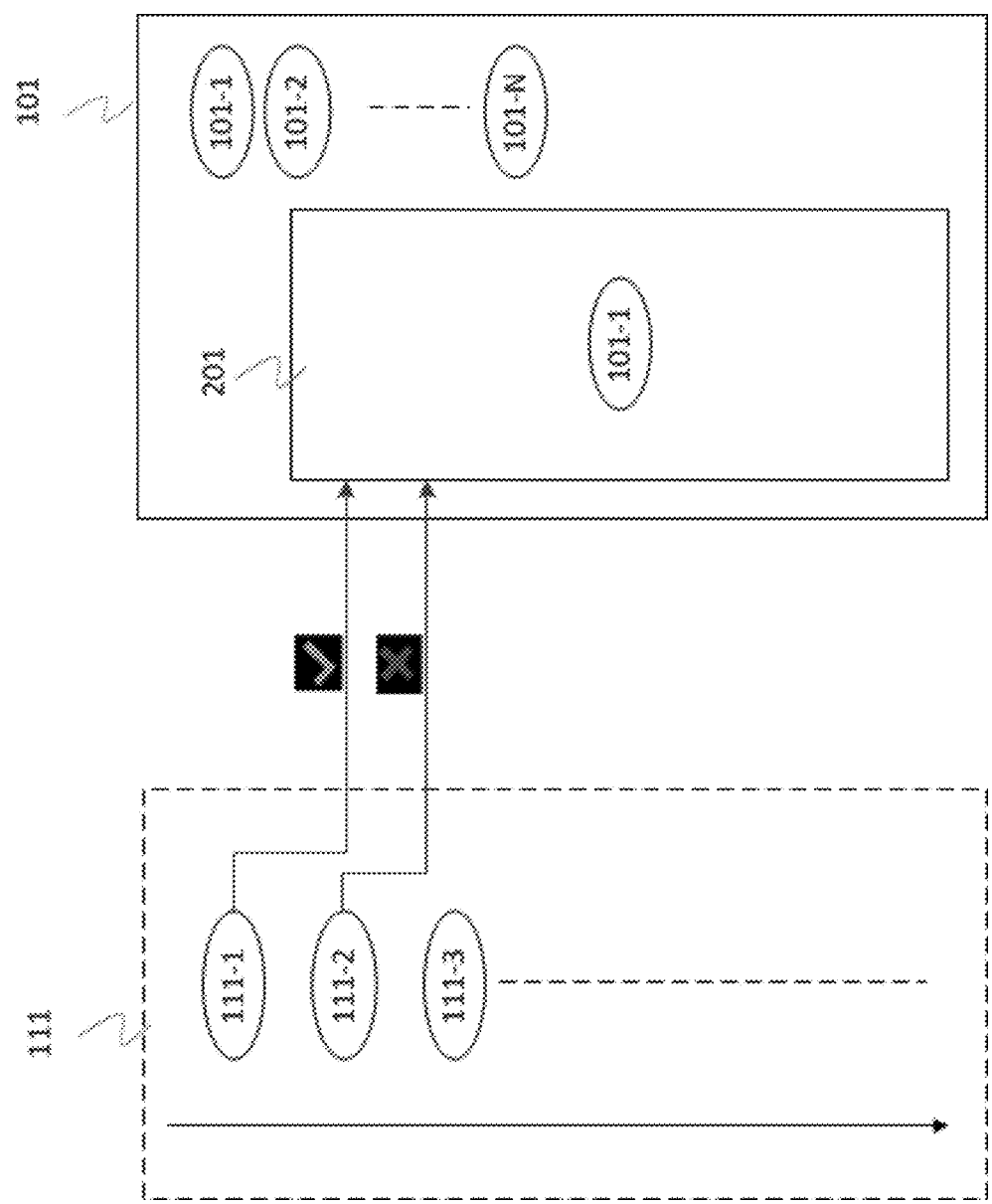
FIG. 2 shows an example of the operation of the authentication scheme when a new program observable arrives from the program behavior stream.

Referring to FIG. 2, in one embodiment, the scheme records and matches a program observable, for example 111-1, to one of the stored program models, such as, for example, 101-1. In one embodiment, the scheme performs the matching in the following way: The program store 101 comprises a cache of system call sequences 201. In one embodiment, a program model 101-1 is stored in the cache 201. FIGS. 3A and 3B show an embodiment of the process when a new program observable such as 111-1 arrives from the program behavior stream 111. When a new program observable 111-1 arrives as shown in step 301 of FIG. 3A and in FIG. 2, then in step 302 of FIG. 3A the scheme queries the cache 201 to determine if the system call sequence 111-1 is in the cache 201.

In step 303 of FIG. 3A, the cache returns a positive response also known as a cache hit, or a negative response also known as a cache miss. For example, referring to FIG. 2, system call sequence 111-1 returns a hit, but system call sequence 111-2 returns a miss. The cache is then updated to include this system call sequence. In one embodiment, the cache is only updated if the cache returns a miss.

If the cache hit rate, that is, the number of positive responses returned by the cache divided by the total number of responses, drops below a specified threshold (step 304 of FIG. 3A), the scheme decides to change program models in step 305 of FIG. 3A, that is, the scheme selects a different program model from the store for loading into the cache. In one embodiment, the scheme does this by calculating a distance measure between the program observable 111-1 and the stored program models 101-1 to 101-N. Then the scheme selects the program model with the least distance, and loads this program model into the cache. In another embodiment, if there are no program models which match the sequences closely enough, the system adds this new set of system call sequences to the program store 101, and the corresponding user behavior is added as a user model to the user store 131. The scheme then returns to the start of the process.

If the cache hit rate is above the threshold, then in step 306 of FIG. 3A, the scheme records user observable 121-1 corresponding to program observable 111-1. In step 307 of FIG. 3A, the scheme then selects the user model corresponding to the selected program model. For example, since user model 131-1 corresponds to stored program model 101-1, the scheme selects and retrieves corresponding user model 131-1.

In step 308 of FIG. 3A, the scheme then correlates user observable 121-1 to user model 131-1. If user observable 121-1 matches user model 131-1, then the scheme determines that the device is in a secure state in step 313 of FIG. 3B. If user observable 121-1 does not match user model 131-1 in step 309 of FIG. 3B, then the scheme determines that the device is in an insecure state, and raises a security event in step 310 of FIG. 3B. In one embodiment, if the number of security events exceeds a threshold (step 311 of FIG. 3B), then the scheme determines that an attack is occurring and takes one or more defensive measures in step 312 of FIG. 3B. In one embodiment, the one or more defensive measures comprise one or more secondary biometric schemes, for example, requesting a fingerprint. In another embodiment, the one or more defensive measures comprise requesting entry of an explicit authentication identifier, for example, a password.

In a further embodiment, the scheme learns the program models and user models as follows: The scheme begins with no knowledge of either program or user behavior. When the scheme runs initially, it fills the previously described system call sequence cache within the store with system call sequences. Incoming system call sequences are compared against the set of system call sequences stored in the cache to determine if there are hits.

In one embodiment, when the hit rate increases beyond a threshold for a set of system call sequences stored in the cache, then the set of system call sequences in the cache is saved as a program model in the program store 101. The corresponding user behavior is added as a user model to the user store 131.

In another embodiment, if there are no program models which match the sequences closely enough, the scheme adds this new set of system call sequences to the program store 101, and the corresponding user behavior is added as a user model to the user store 131, rather than raising a security event.

In a further embodiment, the scheme has an explicit training mode, where security events are not raised until the scheme is trained sufficiently. In one embodiment, a determination of the sufficiency of the training of the scheme is made depending on the hit rate of the cache.

In another embodiment, the scheme initially employs a validation mechanism, wherein the scheme explicitly requests secondary biometric authentication or explicit identifiers such as passwords/PINs from the user. Then if this explicit authentication is successful, the scheme adds the new data to the stores. Once the scheme determines that it has been trained sufficiently, it stops using this validation mechanism.

In a further embodiment, if a security event is raised, the scheme communicates with, for example, a cloud server, to either restrict or deny access to cloud services and cloud data from the device. In a further embodiment, the scheme explicitly requests secondary biometric authentication or explicit identifiers such as passwords/PINs from the user before full access is restored. In one embodiment, the cloud server is the authentication server described in FIG. 1 of U.S. patent application Ser. No. 14/337,939.

Malware or spyware may try to access the program store or the user store. In a further embodiment, access to the program store or the user store is restricted to certain authorized programs. This way, such malware or spyware is denied access to the program store and the user store.

The above-defined primary authentication scheme overcomes the shortcomings of continuous behavioral biometric authentication, in particular, the high variance due to continuous observation by observing the performance of specific tasks. Additionally, the issues with task-based authentication, that is, the ease of circumventing security coverage due to the low coverage of explicitly defined tasks, and the cost and difficulty associated with explicit manual definition and implementation, are dealt with by automatically inferring the tasks in one or more systems running on the device.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for a primary authentication method for use in a device comprising:
    monitoring a program behavior stream comprising a plurality of program observables comprising a program observable;
    recording the program observable to provide a recorded program observable;
    matching the recorded program observable to a program model selected from a plurality of program models stored within a program store, the program store comprising a cache that returns a cache hit or a cache miss depending on the matching of the recorded program observable to the program model;
    calculating a cache hit rate and selecting an alternate program model from the plurality of program models when the cache hit rate drops below a threshold;
    selecting a user model from a plurality of user models stored within a user store corresponding to the program model and the cache hit rate;
    monitoring a user behavior stream corresponding to the program observable;
    recording a user observable contained in the user behavior stream;
    correlating the user observable to the user model; and
    determining an authentication state associated with the device based on the correlating.

2. The method of claim 1, further comprising, based on the authentication state, determining if the device is in an insecure state and raising a security event.

3. The method of claim 2, further comprising determining that an attack is occurring if a number of security events exceeds a second threshold.

4. The method of claim 3, further comprising taking a defensive measure once the attack is determined to be occurring.

5. The method of claim 1, wherein the user behavior stream is a sequence of system calls.

6. The method of claim 1, wherein the user observable comprises sensor data.

7. The method of claim 1, wherein each of the plurality of program models comprises a set of sequences of system calls.

8. The method of claim 1, wherein each of the plurality of user models comprises a set of sensor data.

9. The method of claim 8 wherein the sensor data comprises raw information drawn from the set of sensor data.

10. The method of claim 8 wherein the sensor data comprises features extracted from raw information drawn from the set of sensor data.

11. The method of claim 1, wherein said device is a mobile device.

12. The method of claim 1, wherein selecting of the alternate program model is based on a distance measure.

13. The method of claim 2 further comprising communicating with a cloud server to either restrict or deny access when the device is determined to be in the insecure state.

* * * * *